Sept. 30, 1941.  M. F. MOORE  2,257,639

CAR COOLING

Filed March 29, 1940

INVENTOR.
MEADE F. MOORE.
BY Carl J. Barbee
ATTORNEY.

Patented Sept. 30, 1941

2,257,639

UNITED STATES PATENT OFFICE 2,257,639

CAR COOLING

Meade F. Moore, Kenosha, Wis., assignor to Nash-Kelvinator Corporation, Kenosha, Wis., a corporation of Maryland Application March 29, 1940, Serial No. 326,561

7 Claims. (Cl. 261—104)

This invention relates to car cooling and has particular reference to a system for cooling an automotive vehicle by evaporating water.

It is an object of this invention to provide a novel cooling system that may be installed and operated at low cost.

It is another object of this invention to provide a system by means of which fresh air is cooled and introduced into a vehicle.

It is another object of this invention to provide a cooling system which will not interfere with the usable space within the vehicle.

Other objects and advantages of this invention will be apparent from a consideration of the following description and claims and the attached drawing of which there is one sheet and in which Figure 1 represents a partially broken away side elevation of an automobile with my cooling system installed;

Figure 1:
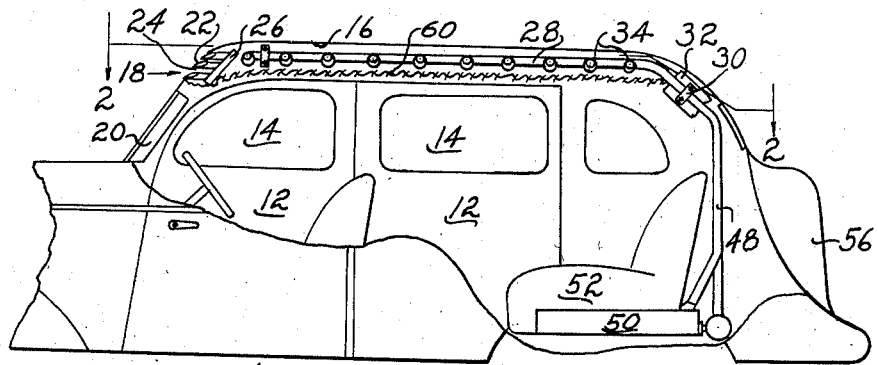

I have shown an automobile having a closed body with the usual doors 12 and windows 14. The body is provided with a top portion 16 which curves down in a front panel 18 over the windshield 20. This construction is the same as that normally used in present day closed car construction. I have found that as a vehicle is driven in a forward direction a zone of high pressure air is set up around the forward portion 18 of the top.

I utilize the air within the high pressure area by providing a series of fins 22 on each side of the front of the vehicle. These fins are mounted so that they can be rotated to form slots 24 through which the high pressure air will flow to the relatively low pressure space within the body of the vehicle. Just inside of the body, behind the fins 22, I locate a suitable rain shedding and filtering assembly 26 which is conveniently supported from the top 16.

Figure 2:
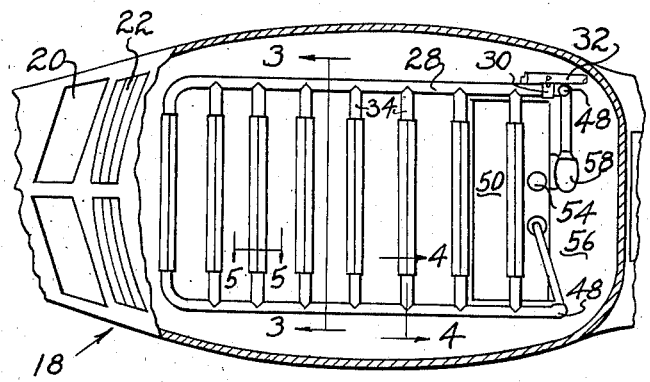
Figure 2 represents a section taken along the line 2—2 of Figure 1 and looking in the direction of the arrows.
Figure 3:
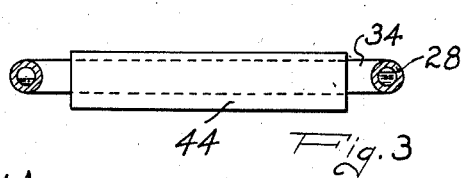
Figure 3 represents a section taken along the line 3—3 of Figure 2 and looking in the direction of the arrows.
Figure 5:
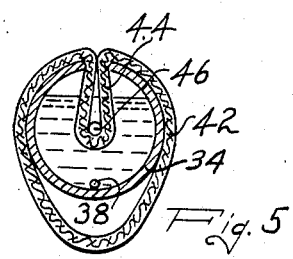
Figure 5 represents a section taken along the line 5—5 of Figure 2 and looking in the direction of the arrows.

Located just underneath the top 16 but spaced therefrom are two longitudinally extending headers 28. The headers are supported by clips 30 secured to ribs 32 (see Figure 2) which form a portion of the framework of the body. If there is no such framework, as when the top 16 is self-sustaining, the clips 30 may be welded to the underside of the top itself.

Extending between the two headers 28 and supported thereby is a series of cross pipes 34 each of which is in open communication with each of the headers 28. I contemplate installing the above pipes so that they will all be approximately level when the vehicle is in its normal position.

Figure 4:
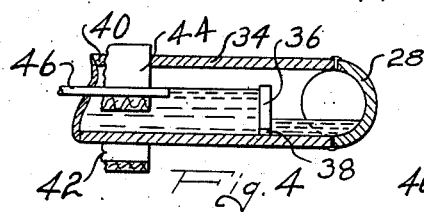
Figure 4 represents a section taken along the line 4—4 of Figure 2 and looking in the direction of the arrows.
Figure 6:
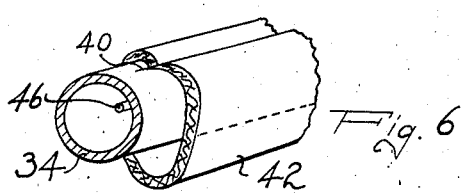
Figure 6 represents a perspective view of a portion of one of the cooling pipes of my invention.

Located within each cross pipe 34 at one end thereof is a dam 36 (see Figure 4) with a small drain hole 38 at its bottom. All of these dams are at the same side of the vehicle so that water supplied through the header furthest from the dams will stand in the cross pipes to a lever determined by the height of the dams. The drain holes 38 have less capacity than the supplying source and are used only to drain the system when it is not in use.

The top of each cross pipe 34 is slotted as at 40 (see Figures 2 to 6) for a considerable portion of its length. A sleeve 42 of absorbent material such as wick cloth is positioned around each cross pipe 34 and has a fold 44 pressed down through the slot 40 to a point below the level of the dam 36. A weighted rod 46 may be included in the fold 44 to assist the assembly and to insure that the fold will hang down behind the dam 36. Soft tubing such as copper is very convenient material for the cross pipes 34. With it the slot 40 may be opened to insert the fold 44 of the sleeve 42 and the sides of the slot may then be squeezed shut to retain the fold 44 in place and to prevent water from slopping out of the slot 40.

The longitudinal headers 28 are carried down at the back of the vehicle at 48 and are connected to a tank 50 located under the back seat 52. The tank 50 is provided with a filler cap 54 accessible through the trunk compartment 56. Water is supplied to the longitudinal header 28 furthest from the dams 36 (the header on the right hand side of the vehicle in the drawing) by an electrically driven pump 58. The operation of the pump may be controlled by a circuit (not shown) from the battery of the vehicle and with a switch located conveniently near the driver.

The pipes 28 and 34 are concealed by the ceiling panel 60 which is made of loosely woven cloth.

When my system is in operation, the pump 58 will supply enough water from the tank 50 to replace that which evaporates and that which runs through the drain holes 38. Any excess will slop over the dams 36 and return to the tank along with the water passing through the drain holes. The folds 44 will suck up water from behind the dams and deliver it by capillary action to that portion of the sleeves 42 outside of the cross pipes 34. Air entering the slots 24 will evaporate some of the water and in so doing will lower the temperature of the air and the remaining water. The cooled air will be diffused through the ceiling panel 60 to cool the occupants of the vehicle, and the cooled water will return to the tank for recirculation, thus cooling the entire supply of water.

It will be noted that my system provides cool air at the top of the vehicle where it is most conveniently distributed as the warm air in the car will rise to be cooled thus creating an even temperature throughout the vehicle. My system may be constructed out of simple parts without expensive machining operations. It has only one moving part and requires no expensive controls. The fins 22 may be opened to ventilate the car without using the cooling system.

While I have described my invention in some detail, I do not intend this description to be limiting and reserve the rights to all structures covered by the attached claims.

I claim:

1. In an automobile, a water circulating system including open troughs, means for withdrawing water from said system comprising wicks dipping into and suspended from said troughs, and means for passing air over said wicks and delivering it into said automobile.

2. In an automotive vehicle having a compartment, means for inducing a flow of air into the top of said compartment, and means for introducing water into said flow of air comprising water circulating means and open troughs having dams therein and in which a water level is maintained constant by water circulating means.

3. In an automobile having a windshield, a top, a frontal wall between said windshield and said top and defining an aperture, means for closing said aperture, filter means behind said aperture, a series of pipes having slots along their top positioned behind said filtering means and under said top, wick means extending into said slots and closing the same, and means for supplying water to said pipes.

4. In an automobile having a windshield, a top, a wall between said windshield and said top defining an aperture, means for closing said aperture, filter means behind said aperture, a series of pipes having slots in their upper surface positioned behind said filter means, wick means extending into said slots and closing the same, means for supplying water to said pipes, and a panel of porous material extending from said windshield and under said pipes.

5. In an automobile having a windshield, a top, a wall between said windshield and top and defining an opening, longitudinal headers behind said opening, cross pipes connecting said headers, said pipes and headers being normally level, means for maintaining water in said pipes at a level less than full, wicks extending through slots in the top of said pipes, and means for supplying water to one of said headers.

6. In an automobile having a windshield, a top, a wall between said top and windshield defining an opening, headers behind said opening, slotted tubes connected between said headers, said tubes and headers being normally level, dams in one end of said tubes extending over part of the area of said tubes, wicks filling the slots in said tubes and extending from outside said tubes to a point below the level of said dams within said tubes, a storage tank connected to said headers, means for delivering fluid from said storage tank to the header furthest from said dams, and a ceiling panel of loosely woven material positioned below said tubes and headers.

7. Air conditioning apparatus for an automotive vehicle including means for inducing a flow of air into said vehicle, a system of open troughs, means including dams in said troughs for maintaining a constant level of liquid cooling material in said troughs, said dams defining drain holes near their lower edge, and absorbent material having a portion thereof submerged in said cooling material and disposed in the path of the incoming air.

MEADE F. MOORE.